(12) United States Patent
Wang et al.

(10) Patent No.: US 12,434,184 B2
(45) Date of Patent: Oct. 7, 2025

(54) DUST REDUCTION DEVICE FOR BUILDING ENGINEERING

(71) Applicant: Taizhou University, Taizhou (CN)

(72) Inventors: Yangrui Wang, Taizhou (CN); Xinyu Shen, Taizhou (CN); Jing Yu, Taizhou (CN); Chuanfei Shen, Taizhou (CN)

(73) Assignee: Taizhou University, Taizhou (CN)

( * ) Notice: Subject to any disclaimer, the term of this patent is extended or adjusted under 35 U.S.C. 154(b) by 0 days.

(21) Appl. No.: 19/224,800

(22) Filed: May 31, 2025

(65) Prior Publication Data

US 2025/0288937 A1    Sep. 18, 2025

(30) Foreign Application Priority Data

Apr. 27, 2025  (CN) .......................... 202510540700.8

(51) Int. Cl.
| | | |
|---|---|---|
| *B01F 23/23* | (2022.01) | |
| *B01D 47/06* | (2006.01) | |
| *B01F 23/213* | (2022.01) | |
| *B05B 3/02* | (2006.01) | |
| *B05B 9/00* | (2006.01) | |
| *B05B 12/12* | (2006.01) | |
| *B05B 12/34* | (2018.01) | |
| *B05B 15/628* | (2018.01) | |

(52) U.S. Cl.
CPC ............ *B01D 47/06* (2013.01); *B01F 23/213* (2022.01); *B05B 3/025* (2013.01); *B05B 9/007* (2013.01); *B05B 12/12* (2013.01); *B05B 12/34* (2018.02); *B05B 15/628* (2018.02); *B01D 2221/08* (2013.01)

(58) Field of Classification Search
CPC .............................. B01F 23/213; B01D 47/06
See application file for complete search history.

(56) References Cited

FOREIGN PATENT DOCUMENTS

| CN | 114703786 A | * | 7/2022 | ............... E01H 3/02 |
|---|---|---|---|---|
| CN | 218281088 U | | 1/2023 | |

OTHER PUBLICATIONS

CN 218281088 U to Lu, Wangda, issued Jan. 13, 2023, English machine translation, pp. 1-11.

* cited by examiner

*Primary Examiner* — Robert A Hopkins
(74) *Attorney, Agent, or Firm* — Addison D. Ault; IPGentleman Intellectual Property Services, LLC

(57) ABSTRACT

The present invention relates to the technological field of civil engineering, particularly to a dust reduction device for building engineering. The device includes a water tank with a controller and a booster pump, a driving mechanism enabling the device to cross obstacles, an adjustable spray mechanism with a mist intercepting mechanism, and an environment detection mechanism. The dust reduction device comprising the above components can move along the enclosure barrier to a target position for spraying according to real time requirements. The adjustable spray mechanism is configured in such a way that, when the wind force is between the specified minimum value and maximum value, and the wind direction is opposite to the spray direction, the mist intercepting mechanism is activated to avoid water mist blowing outside the construction site by wind and affecting the normal passage of pedestrians.

8 Claims, 7 Drawing Sheets

DUST REDUCTION DEVICE FOR BUILDING ENGINEERING

TECHNICAL FIELD

The present invention relates to the technological field of civil engineering, particularly to a dust reduction device for building engineering.

BACKGROUND

Currently, a large amount of dust is inevitable at construction sites of building engineering due to the required handling of multiple equipment and noisy environment. On the one hand, the dust pollution will reduce the field of vision and affect on-site operations such as tower crane transportation. On the other hand, the long-time exposure to the dusty air will cause great harm to the workers' health. In the prior art, dust reduction is carried out by installing a dust reduction device or arranging a spray device above an enclosure barrier. For example, the patent with Publication No. CN218281088U discloses a dust reduction device for building engineering, the device includes a water tank, a water pump fixed upon the water tank, a pumping pipe rigidly connected at the bottom of the water pump, a connecting pipe fixedly connected at the top of the water tank, a spraying head fixedly connected at the top of the connecting pipe, a mounting mechanism fixedly connected at the rear side of the water tank, and a positioning mechanism arranged in the mounting mechanism. The mounting mechanism includes a connecting block, which is fixedly connected to the rear side of the water tank. Through the arranged mounting mechanism, the workers only need to rotate a torsion plate to mount the water tank upon the enclosure barrier, there is no need for the workers to use a drilling machine to drill and fix it in the enclosure barrier, which reduces the damage to the enclosure barrier, and the operation is simple and convenient for the workers to use, and promoting the work efficiency for the workers when disassembling and replacing the position of the dust reduction device. However, the following problems still exist:

(1) Fixed mounting on enclosure barriers requires a large number of spray devices during road construction or strip construction sites. Since most constructions are locally conducted, the use of fixed spraying dust reduction devices will occupy a large space on the ground and affect normal traffic.

(2) When subjected to heavy wind, the water mist is easily blown outside the construction site, which will affect the normal passage of pedestrians.

SUMMARY

An objective of the present invention is to provide a dust reduction device for building engineering to solve the above technical problems.

In order to achieve the above objective, the present invention provides a dust reduction device for building engineering, the device includes a water tank provided with a controller, a booster pump is arranged in the water tank, a driving obstacle crossing mechanism is arranged at the bottom of the water tank for driving the water tank to move over or along an enclosure barrier, an adjustable spray mechanism is arranged at the top of the water tank, the adjustable spray mechanism is connected to the booster pump through a pipeline, the adjustable spray mechanism is provided with a water mist intercepting mechanism for blocking water mist, and an environment detection mechanism is arranged at the top of the water tank.

Preferably, the driving obstacle crossing mechanism includes a plurality of supporting components linearly distributed at the bottom of the water tank, the supporting components include a supporting lifting push rod, and a supporting roller arranged at a telescopic end of the supporting lifting push rod, the bottom of the water tank is provided with a plurality of groups of clamping components, the clamping components include a connecting slider, two sides of the connecting slider are provided with adjusting springs, the connecting slider and the adjusting springs are both arranged in a sliding groove at the bottom of the water tank, a traveling drive motor is arranged on the connecting slider, and an output shaft of the traveling drive motor is connected to a clamping roller; the supporting lifting push rod and the traveling driving motor are electrically connected to the controller.

Preferably, the supporting roller is provided with a limiting groove, an adjusting groove is arranged in the limiting groove, a limiting ring is mounted in the adjusting groove by a bolt, two limiting rings are arranged, and a spacing between the two limiting rings is larger than a thickness of the enclosure barrier.

Preferably, the environment detection mechanism includes a wind direction sensor and a wind speed sensor, and the wind direction sensor and the wind speed sensor are both electrically connected to the controller.

Preferably, a plurality of linearly distributed distance sensors are arranged at a front end of the water tank, the distance sensors are electrically connected to the controller, and when the water tank travels to a connection of the enclosure barrier, the support lifting push rods of the plurality of supporting components are sequentially contracted and then extended to realize crossing the connection of the enclosure barrier.

Preferably, the adjustable spraying mechanism includes a spraying angle adjusting motor, an output shaft of the spraying angle adjusting motor is connected to a rotating plate, a rotating disc is mounted on the top of the rotating plate, a length-adjusting telescopic rod is mounted on the rotating disc, a spraying head is arranged on a telescopic end of the length-adjusting telescopic rod through a following angle adjusting motor, and the spraying head is connected to the booster pump through the pipeline; the spraying angle adjusting motor, the rotating disc, the length-adjusting telescopic rod and the following angle adjusting motor are electrically connected to the controller.

Preferably, the water mist intercepting mechanism includes an extension plate mounted on the circumferential side of the telescopic end of the length-adjusting telescopic rod, the extension plate is provided with an unfold-driving component, and the unfold-driving component is provided with a breathable and waterproof membrane.

Preferably, the unfold-driving component includes an interception angle adjusting motor arranged on the extension plate, an output end of the interception angle adjusting motor is mounted with a limiting plate, an unfold-driving motor and a fixing plate are mounted on the limiting plate, an output shaft of the unfold-driving motor is mounted with two driving gears arranged in parallel, the two driving gears are respectively meshed with two unfolding racks, the unfolding racks are slidably arranged on the limiting plate, the two unfolding racks are connected to a moving plate, and the breathable and waterproof membrane is arranged between the moving plate and the fixing plate; the interception angle adjusting motor and the unfold-driving motor are electrically connected to the controller.

Preferably, the breathable and waterproof membrane sequentially includes a non-woven fabric protective layer, a polyethylene (PE) polymer breathable layer and a non-woven fabric reinforcing layer, the non-woven fabric reinforcing layer is connected to a connecting column, and the connecting column is slidably arranged in the unfolding rack.

Therefore, the present invention adopts the above-mentioned dust reduction device for building engineering, and has the following benefits:

(1) The whole device can move along the enclosure barrier to specific positions for spraying according to the real time requirements, without largely occupying the ground space.

(2) The adjustable spray mechanism is provided with a water mist intercepting mechanism for blocking water mist, when the wind force is greater than the specified minimum value, lower than the maximum value, and the wind direction is opposite to the spray direction, the water mist intercepting mechanism is activated to avoid the water mist blowing outside the construction site by the wind and affecting the normal passage of pedestrians.

Further detailed descriptions of the technical scheme of the present invention can be found in the accompanying drawings and embodiments.

Figure 1:
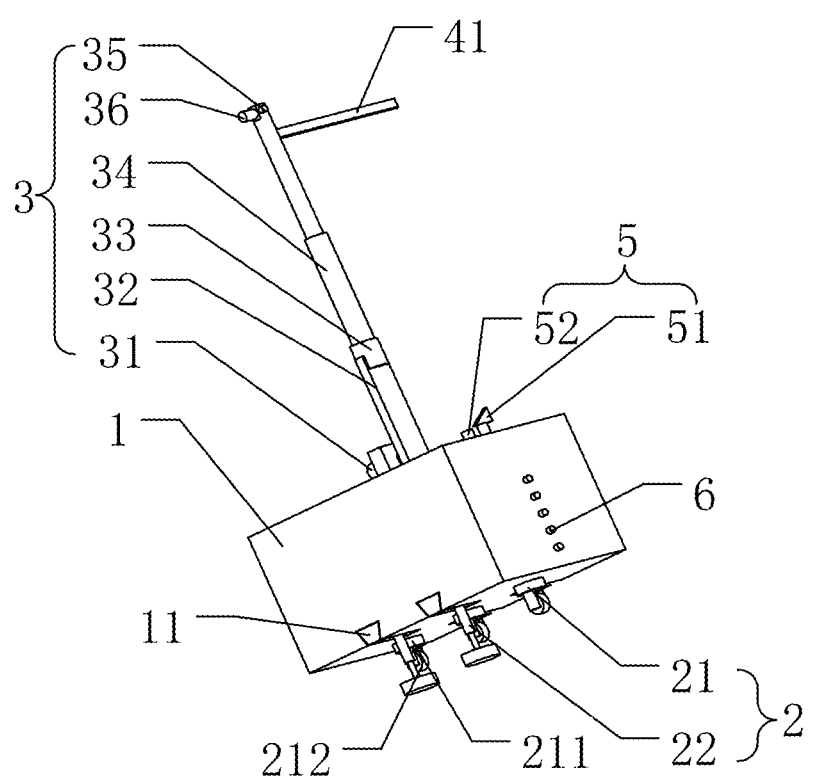
FIG. 1 is a structural schematic diagram of a dust reduction device for building engineering of the present invention.

REFERENCE NUMERALS IN FIGS 1, a water tank; 11, a sliding groove; 2, a driving obstacle crossing mechanism; 21, a supporting component; 211, a supporting lifting push rod; 212, a supporting roller; 213, a limiting groove; 214, an adjusting groove; 215, a limiting ring; 22, a clamping component; 221, a connecting slider; 222, an adjusting spring; 223, a traveling drive motor; 224, a clamping roller; 3, an adjustable spray mechanism; 31, a spraying angle adjusting motor; 32, a rotating plate; 33, a rotating disc; 34, a length-adjusting telescopic rod; 35, a following angle adjusting motor; 36, a spraying head; 4, a water mist intercepting mechanism; 41, an extension plate; 42, an unfold-driving component; 421, an interception angle adjusting motor; 422, a limiting plate; 423, an unfold-driving motor; 424, a driving gear; 425, an unfolding rack; 426, a moving plate; 427, a fixing plate; 43, a breathable and waterproof membrane; 431, a non-woven fabric protective layer; 432, a PE polymer breathable layer; 433, a non-woven fabric reinforcing layer; 434, a connecting column; 5, an environment detection mechanism; 51, a wind direction sensor; 52, a wind speed sensor; 6, a distance sensor.

DETAILED DESCRIPTION OF THE EMBODIMENTS

In the above description of the present invention, it is to be noted that the orientation or positional relationship indicated by terms "up", "down", "inner", "outer", etc. is based on the orientation or positional relationship shown in the accompanying drawings, or the orientation or positional relationship of a product conventionally placed during use, merely for ease of description and simplification of the description of the present invention, and not to indicate or imply that the referenced device or element must have a particular orientation and be constructed and operative in a particular orientation, and thus may not be construed as a limitation on the present invention. In the description of the present invention, it should be further noted that, unless otherwise explicitly specified and defined, the terms "arrangement", "mounting" and "connection" should be understood in a broad sense, for example, they may be a fixed connection, a detachable connection, or an integrated connection; may be a mechanical connection, or an electrical connection; and may be a direct connection, or an indirect connection via an intermediate medium, or communication inside two elements. For those of ordinary skill in the art, the specific meanings of the above terms in the present invention may be understood according to specific circumstances.

The following is a detailed description of embodiments of the present invention in conjunction with the accompanying drawings.

As shown in FIG. 1, a dust reduction device for building engineering, the device includes the water tank 1 provided with the controller, the driving obstacle crossing mechanism 2, the adjustable spray mechanism 3, the water mist intercepting mechanism 4 and the environment detection mechanism 5.

The adjustable spray mechanism 3 is arranged at the top of the water tank 1, the adjustable spray mechanism 3 is connected to the booster pump inside the water tank 1 through the pipeline to provide high-pressure water for the adjustable spray mechanism 3.

Figure 2:
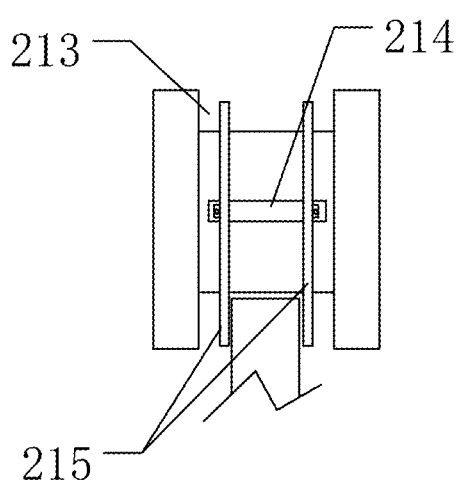
FIG. 2 is a structural schematic diagram of a supporting roller of the present invention.
Figure 3:
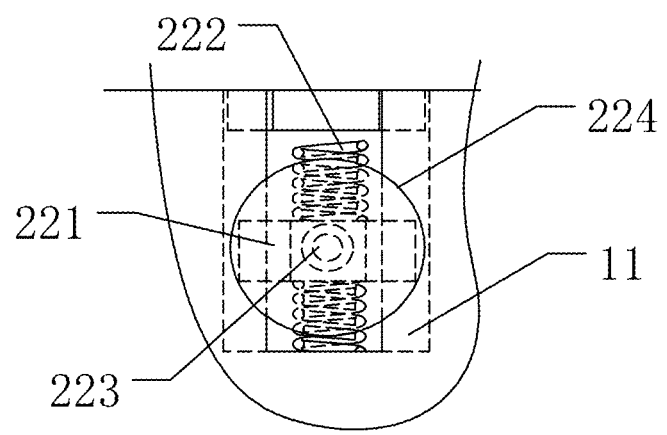
FIG. 3 is a structural schematic diagram of a clamping component of the present invention.
Figure 4:
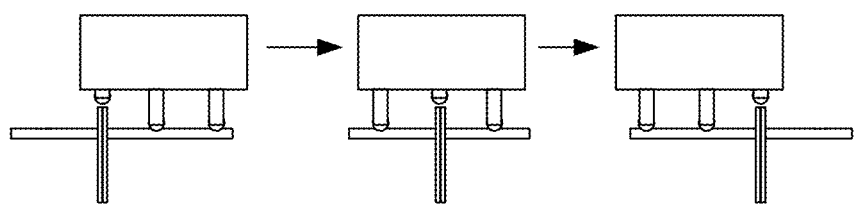
FIG. 4 is a schematic diagram of a process of crossing a connection of an enclosure barrier of the present invention.

The driving obstacle crossing mechanism 2 is arranged at the bottom of the water tank 1 for driving the water tank 1 to move along the enclosure barrier. The driving obstacle crossing mechanism 2 includes a plurality of supporting components 21 linearly distributed at the bottom of the water tank 1, the supporting components 21 include the supporting lifting push rod 211, and the supporting roller 212 arranged at the telescopic end of the supporting lifting push rod 211, as shown in FIG. 2, the supporting roller 212 is provided with the limiting groove 213, the adjusting groove 214 is arranged in the limiting groove 213, the limiting rings 215 are mounted in the adjusting groove 214 by bolts, two limiting rings 215 are arranged, and the spacing between the two limiting rings 215 is larger than the thickness of the enclosure barrier, so that the supporting roller 212 spans the top of the enclosure barrier, and the position of the limiting ring 215 can be adjusted to facilitate the application of different thickness enclosure barriers. The bottom of the water tank 1 is provided with a plurality of groups of clamping components 22, as shown in FIG. 3, the clamping components 22 include the connecting slider 221, two sides of the connecting slider 221 are provided with adjusting springs 222, the connecting slider 221 and the adjusting springs 222 are both arranged in the sliding groove 11 at the bottom of the water tank 1, the traveling drive motor 223 is arranged on the connecting slider 221, and the output shaft of the traveling drive motor 223 is connected to the clamping roller 224, the supporting lifting push rod 211 and the traveling driving motor 223 are electrically connected to the controller. Because some of the enclosure barrier surface is a corrugated structure or has a reinforcing plate, the enclosure barrier surface is uneven, under the action of the adjusting spring 222, it can be adjusted according to the actual situation, so that the water tank 1 is smoother in the moving process. A plurality of linearly distributed distance sensors 6 are arranged at the front end of the water tank 1 for detecting whether there is a raised connecting column, when the water tank 1 travels to the connection of the enclosure barrier, the support lifting push rods 211 of the plurality of supporting components 21 are sequentially contracted and then extended to realize crossing the connection of the enclosure barrier. The position of the device is adjusted according to the real time requirements.

The adjustable spraying mechanism 3 includes the spraying angle adjusting motor 31, the output shaft of the spraying angle adjusting motor 31 is connected to the rotating plate 32, the rotating disc 33 is mounted on the top of the rotating plate 32, the length-adjusting telescopic rod 34 is mounted on the rotating disc 33, the spraying head 36 is arranged on the telescopic end of the length-adjusting telescopic rod 34 through the following angle adjusting motor 35, and the spraying head 36 is connected to the booster pump through the pipeline, the spraying angle adjusting motor 31, the rotating disc 33, the length-adjusting telescopic rod 34 and the following angle adjusting motor 35 are electrically connected to the controller. The spraying for dust reduction at different heights can be realized, meanwhile, by controlling the rotation angle of the rotating disc 33, the swing spraying within a certain angle can be realized, meanwhile, by arranging the following angle adjusting motor 35, the upper and lower angles can be adjusted according to the spraying requirements to realize multi-dimensional adjustment of spraying for dust reduction.

The environment detection mechanism 5 is arranged at the top of the water tank 1, the environment detection mechanism 5 includes the wind direction sensor 51 and the wind speed sensor 52, and the wind direction sensor 51 and the wind speed sensor 52 are both electrically connected to the controller to collect the wind direction and wind speed at the construction site, when the wind speed is too large, the spraying head 36 is closed to stop the spraying.

Figure 5:
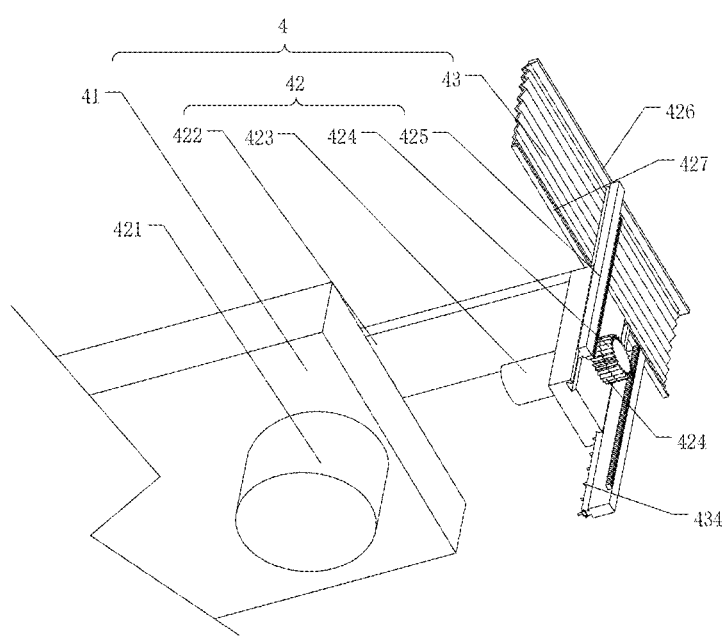
FIG. 5 is a structural schematic diagram of a water mist intercepting mechanism of the present invention.
Figure 6:
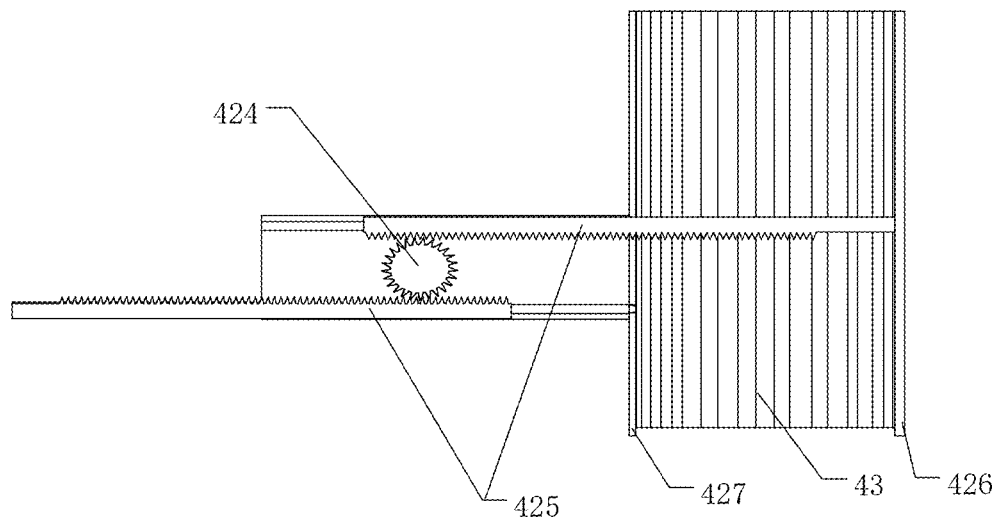
FIG. 6 is a structural schematic diagram of a limiting plate of the present invention.
Figure 7:
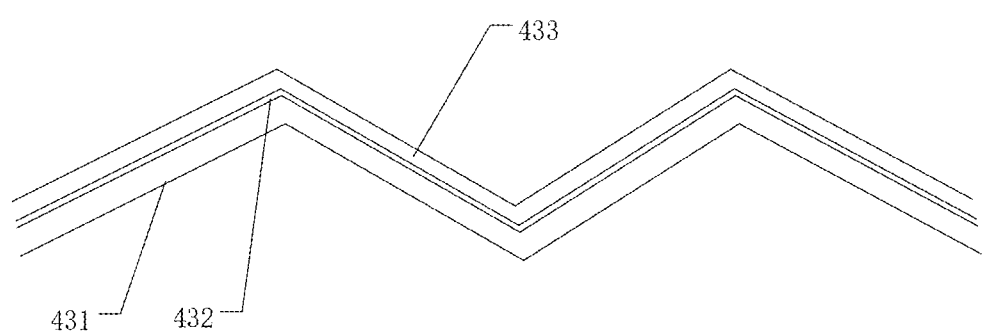
FIG. 7 is a structural schematic diagram of a breathable and waterproof membrane of the present invention.

The adjustable spray mechanism 3 is provided with the water mist intercepting mechanism 4 for blocking water mist, as shown in FIG. 5 and FIG. 6, the water mist intercepting mechanism 4 includes the extension plate 41 mounted on the circumferential side of the telescopic end of the length-adjusting telescopic rod 34, the extension plate 41 is provided with the unfold-driving component 42, and the unfold-driving component 42 is provided with the breathable and waterproof membrane 43 (only one side of the breathable and waterproof membrane 43 is shown in the figure, the other side is not depicted). The unfold-driving component 42 includes the interception angle adjusting motor 421 arranged on the extension plate 41, the output end of the interception angle adjusting motor 421 is mounted with the limiting plate 422, the unfold-driving motor 423 is mounted on the limiting plate 422, the output shaft of the unfold-driving motor 423 is mounted with two driving gears 424 arranged in parallel, the two driving gears 424 are respectively meshed with two unfolding racks 425, the unfolding racks 425 are slidably arranged on the limiting plate 422, the two unfolding racks 425 are connected to the moving plate 426, and the breathable and waterproof membrane 43 is arranged between the moving plate 426 and the fixing plate 427, the interception angle adjusting motor 421 and the unfold-driving motor 423 are electrically connected to the controller. As shown in FIG. 7, the breathable and waterproof membrane 43 sequentially includes the non-woven fabric protective layer 431, the PE polymer breathable layer 432 and the non-woven fabric reinforcing layer 433, the non-woven fabric reinforcing layer 433 is connected to the connecting column 434, and the connecting column 434 is slidably arranged in the unfolding rack 425, when the moving plate 426 returns to the initial position, each connecting column 434 slides to the limiting plate 422, so that the permeable and waterproof membrane 43 folds near the limit plate 422. When the current wind speed affects the spraying direction, two breathable and waterproof membranes 43 are opened to intercept the water mist, so as to avoid the water mist from drifting to the road or other basic equipment outside the construction, which affects the normal passage of pedestrians.

Finally, it should be noted that the above embodiments are merely used for describing the technical solutions of the present invention, rather than limiting the the technical solutions of the present invention. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. A dust reduction device for building engineering, wherein the device comprises:
   a water tank provided with a controller, wherein a booster pump is arranged in the water tank;
   a driving obstacle crossing mechanism arranged at the bottom of the water tank for driving the water tank to move along an enclosure barrier;
   an adjustable spray mechanism arranged at the top of the water tank, wherein the adjustable spray mechanism is connected to the booster pump through a pipeline, the adjustable spray mechanism is provided with a water mist intercepting mechanism for blocking water mist, and an environment detection mechanism is arranged at the top of the water tank;
   wherein the driving obstacle crossing mechanism comprises a plurality of supporting components linearly distributed at the bottom of the water tank, wherein the supporting components comprise a supporting lifting push rod, and a supporting roller arranged at a telescopic end of the supporting lifting push rod;
   the bottom of the water tank is provided with a plurality of groups of clamping components, wherein the clamping components comprise a connecting slider, two sides of the connecting slider are provided with adjusting springs, the connecting slider and the adjusting springs are both arranged in a sliding groove at the bottom of the water tank, a traveling drive motor is arranged on the connecting slider, and an output shaft of the traveling drive motor is connected to a clamping roller; and
   the supporting lifting push rod and the traveling driving motor are electrically connected to the controller.

2. The dust reduction device for building engineering according to claim 1, wherein:

the supporting roller is provided with a limiting groove, an adjusting groove is arranged in the limiting groove, and at least two limiting rings are mounted in the adjusting groove by a bolt;

wherein two limiting rings are arranged such that a spacing between the two limiting rings is larger than a thickness of the enclosure barrier.

3. The dust reduction device for building engineering according to claim 2, wherein:

the environment detection mechanism comprises a wind direction sensor and a wind speed sensor, and the wind direction sensor and the wind speed sensor are both electrically connected to the controller.

4. The dust reduction device for building engineering according to claim 3, wherein:

a plurality of linearly distributed distance sensors are arranged at a front end of the water tank, the distance sensors are electrically connected to the controller, and when the water tank travels to a connection of the enclosure barrier, the support lifting push rods of the plurality of supporting components are sequentially contracted and then extended to realize crossing the connection of the enclosure barrier.

5. The dust reduction device for building engineering according to claim 4, wherein:

the adjustable spraying mechanism comprises a spraying angle adjusting motor, wherein an output shaft of the spraying angle adjusting motor is connected to a rotating plate, a rotating disc is mounted on the top of the rotating plate, a length-adjusting telescopic rod is mounted on the rotating disc, a spraying head is arranged on a telescopic end of the length-adjusting telescopic rod through a following angle adjusting motor, and the spraying head is connected to the booster pump through the pipeline;

wherein the spraying angle adjusting motor, the rotating disc, the length-adjusting telescopic rod and the following angle adjusting motor are electrically connected to the controller.

6. The dust reduction device for building engineering according to claim 5, wherein:

the water mist intercepting mechanism comprises an extension plate mounted on a circumferential side of the telescopic end of the length-adjusting telescopic rod, the extension plate is provided with an unfold-driving component, and the unfold-driving component is provided with a breathable and waterproof membrane.

7. The dust reduction device for building engineering according to claim 6, wherein:

the unfold-driving component comprises an interception angle adjusting motor arranged on the extension plate, an output end of the interception angle adjusting motor is mounted with a limiting plate, an unfold-driving motor and a fixing plate are mounted on the limiting plate, an output shaft of the unfold-driving motor is mounted with two driving gears arranged in parallel, the two driving gears are respectively meshed with two unfolding racks;

wherein the unfolding racks are slidably arranged on the limiting plate, the two unfolding racks are connected to a moving plate, and the breathable and waterproof membrane is arranged between the moving plate and the fixing plate;

wherein the interception angle adjusting motor and the unfold-driving motor are electrically connected to the controller.

8. The dust reduction device for building engineering according to claim 7, wherein:

the breathable and waterproof membrane sequentially comprises a non-woven fabric protective layer, a polyethylene (PE) polymer breathable layer and a non-woven fabric reinforcing layer, wherein the non-woven fabric reinforcing layer is connected to a connecting column, and the connecting column is slidably arranged in the unfolding rack.

\* \* \* \* \*